United States Patent [19]

Piegza et al.

[11] Patent Number: 4,750,635
[45] Date of Patent: Jun. 14, 1988

[54] SAFETY LATCH MECHANISM FOR CLOSURE OF A PRESSURE VESSEL

[75] Inventors: Henry J. Piegza, Clarence; Thomas F. Ivancic, Tonawanda, both of N.Y.

[73] Assignee: WSF Industries, Inc., Tonawanda, N.Y.

[21] Appl. No.: 93,694

[22] Filed: Sep. 8, 1987

Related U.S. Application Data

[63] Continuation of Ser. No. 012,284, Feb. 9, 1987, abandoned.

[51] Int. Cl.$^4$ .............................................. B65D 45/00
[52] U.S. Cl. ...................................... 220/316; 220/319
[58] Field of Search ...................... 220/316, 319, 320; 292/256.6, 256.71, 256.73

[56] References Cited

U.S. PATENT DOCUMENTS

| 1,208,041 | 12/1916 | Steere. | |
|---|---|---|---|
| 1,333,262 | 3/1920 | Levy et al. | |
| 1,470,371 | 10/1923 | Ahrens. | |
| 2,596,353 | 5/1952 | Zollinger | 18/7 |
| 2,706,999 | 4/1955 | Pickard | 137/584 |
| 3,458,083 | 7/1969 | Erwin, Jr. | 220/316 |
| 3,830,400 | 8/1974 | Piegza. | |
| 3,900,605 | 11/1976 | Hanke et al. | 220/316 |
| 4,288,001 | 9/1981 | Lankston | 220/316 |
| 4,423,825 | 1/1984 | Baumgarten | 220/316 |
| 4,452,372 | 6/1984 | Robbins | 220/316 |
| 4,515,287 | 5/1985 | Baudoux et al. | 220/316 |

FOREIGN PATENT DOCUMENTS 412700 7/1934 United Kingdom.

Primary Examiner—George T. Hall
Attorney, Agent, or Firm—Bean, Kauffman & Bean

[57] ABSTRACT

A safety latch mechanism for use in connection with a pressure vessel of the type having a shell, a closure for removably closing an access opening defined by the shell and a locking ring rotatably supported by the shell adjacent the access opening for releasably locking the closure in access opening closed position. The mechanism features a first latch member mounted by the shell for releaseably preventing unlocking rotation of the locking ring relative to the shell and a second latch member mounted by the locking ring and responsive to movement of the first member for releaseably preventing relative rotational movements of the locking ring and closure. The first member is operatively associated with a vessel exhaust valve, which tends to constrain unlatching movements of the first and second latch members, when the pressure within the vessel exceeds a safe level at which the closure may be operated without the possibility of injury to person or property.

16 Claims, 2 Drawing Sheets

SAFETY LATCH MECHANISM FOR CLOSURE OF A PRESSURE VESSEL

BACKGROUND OF THE INVENTION

Heretofore, various attempts have been made to design safety latch mechanisms for pressure vessels, which serve to prevent unlocking of a vessel closure until pressure within the vessel has been reduced to a safe level or to prevent pressurization of a vessel until a closure therefor is in a desired locked condition, and as by way of illustration, reference can be made to U.S. Pat. Nos. 1,208,041; 1,333,262; 1,470,371; 2,596,353; 2,706,999 and 3,830,400 and British Pat. No. 412,700.

SUMMARY OF THE INVENTION

The present invention is directed to a safety latch mechanism for pressure vessels of the type having a shell defining an access opening, a closure or door for removably closing the access opening and a locking ring rotatably supported on the shell adjacent the access opening for releasably locking the closure in closed condition, and more particularly to a latch mechanism adapted for simultaneously interconnecting the shell, locking ring and the closure in a manner adapted to prevent pressurization of a pressure vessel until the closure is properly locked in access opening closed condition and to prevent release of the door for opening movements until pressure within the vessel is reduced to some predetermined level.

More specifically, the latch mechanism of the present invention includes first, second and third shear members in the form of steel plates, carried by the shell, locking ring and closure, respectively; a first latch member which is associated with a vessel exhaust valve and mounted on the shell for reciprocating movement between a latched position, wherein the exhaust valve is in an exhaust closed condition and the first latch member is operatively engaged with the first and second shear members to prevent rotation of the locking ring from its locked condition, and an unlatched position, wherein the exhaust valve is in an exhaust open condition and the first latch member is removed from operative engagement with the second shear member; and a second latch member mounted on the locking ring for reciprocating movement between latched and unlatched positions, wherein it is operatively engaged with and disengaged from the third shear member. Movement of the second latch member is controlled by movement of the first latch member and the exhaust valve tends to retain the latch members in their latched positions until pressure within the vessel is reduced to some predetermined level.

The present mechanism is preferably provided with means to sense placement of the second latch member in operative engagement with the third shear member for vessel condition warning or operation control purposes. Further, where the vessel is of type having a hydraulic circuit to control fluid cylinder induced rotations of the locking ring between its locked and unlocked conditions, the first latch member is preferably operatively associated with a flow control valve serving to prevent operation of the fluid cylinder for purposes of rotating the locking ring away from its locked condition until the first latch member is placed in its unlatched position.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
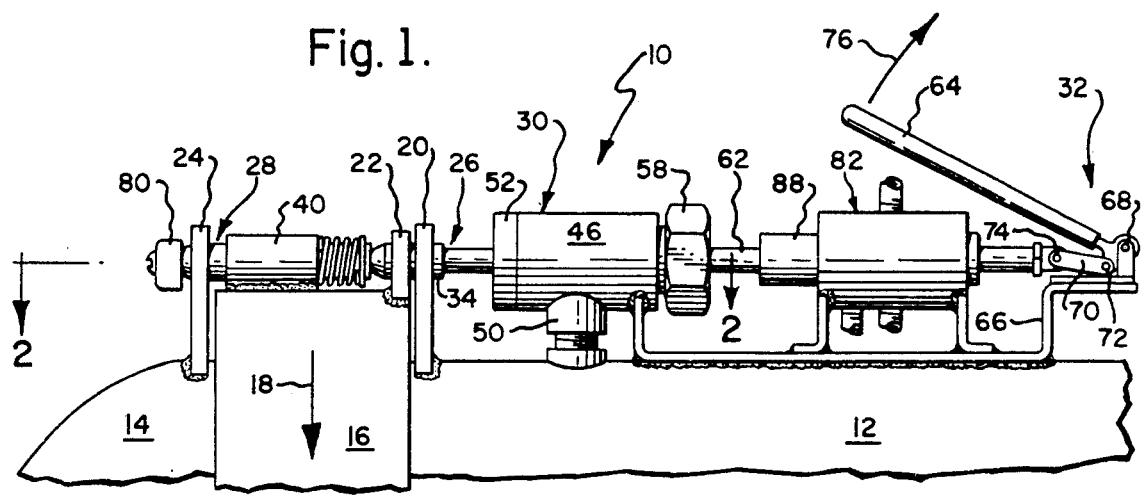
FIG. 1 is a fragmentary side elevational view of a pressure vessel employing a latch mechanism of the present invention, wherein the latch mechanism is depicted in a latched condition.
Figure 2:
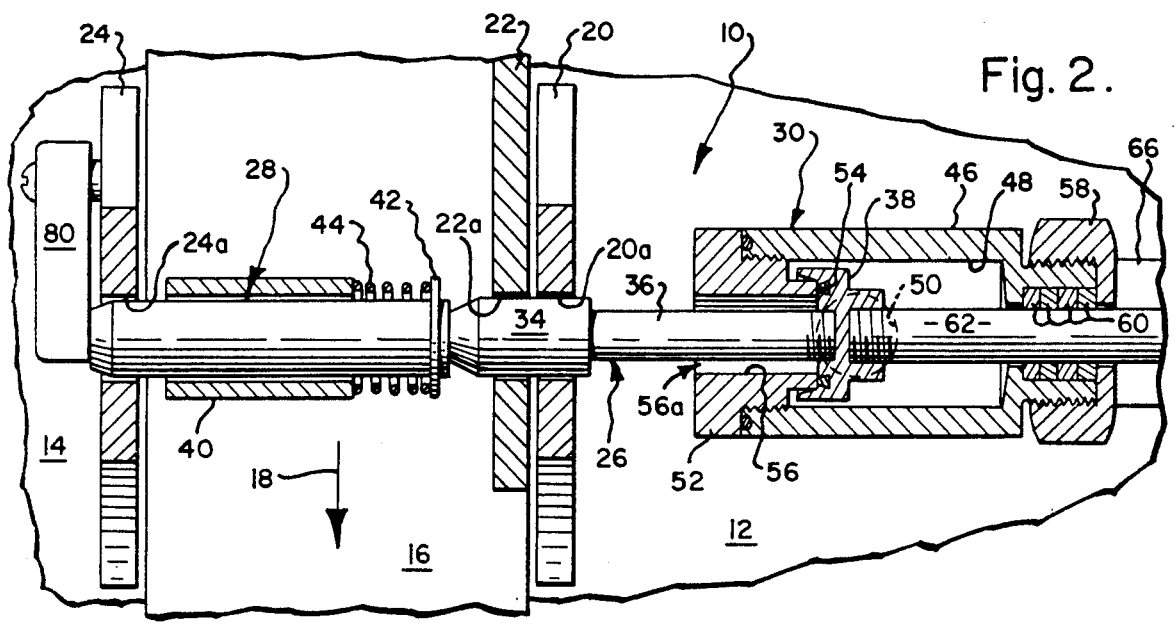
FIG. 2 is a sectional view taken generally along the line 2—2 in FIG. 1.
Figure 3:
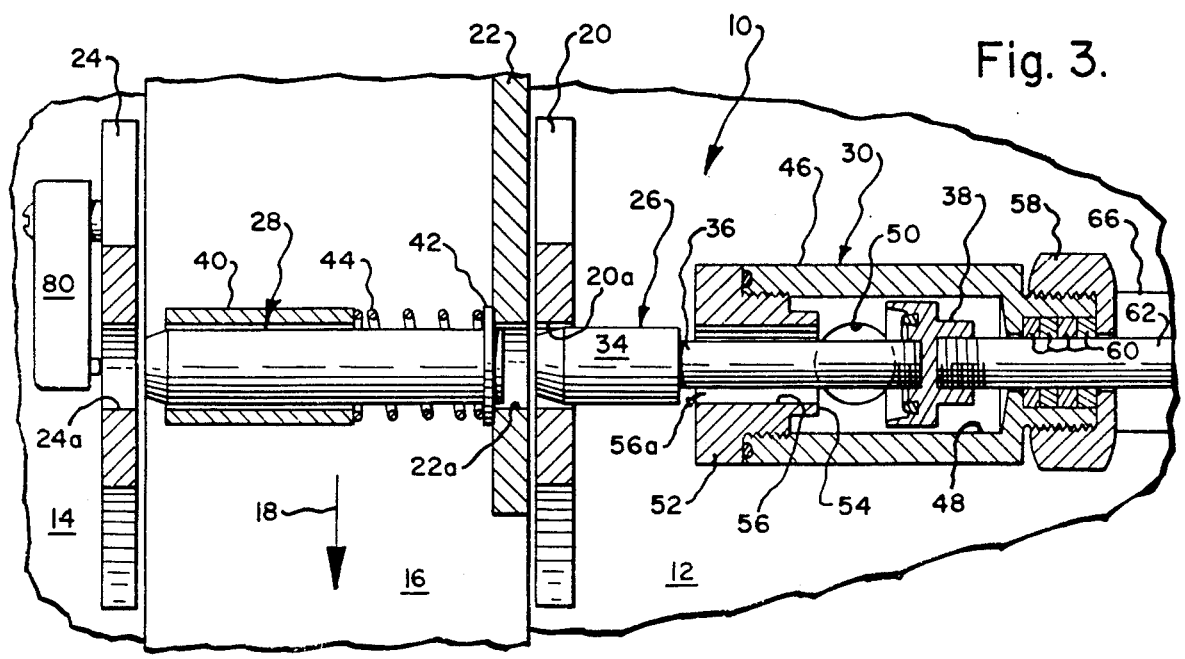
FIG. 3 is a view similar to FIG. 2, but showing the latch mechanism in an unlatched condition.

A latch mechanism formed in accordance with the present invention is generally designated as 10 and shown in FIGS. 1-3 in association with a pressure vessel comprising a generally cylindrical shell 12 having an end access opening, not shown, a closure or door 14 for removably closing the access opening and a locking ring 16 rotatably supported by the shell peripherally of the access opening for releasably locking the closure in closed condition. In the drawings, closure 14 is shown in its closed condition and locking ring 16 is shown in its locked condition with arrow 18 designating the direction in which the locking ring is rotated for purposes of assuming an unlocked position, not shown, in which the closure is released for opening movement. A pressure vessel of this general type is disclosed for example in commonly assigned U.S. Pat. Nos. 3,488,883 and 3,830,400.

Latch mechanism 10 includes first, second and third shear members 20, 22 and 24, which are preferably in the form of sturdy steel plates fixed, as by welding, to extend peripherally of shell 12, locking ring 16 and closure 14, respectively, to assume a parallel relationship when closure 14 is disposed in its illustrated closed position. Shear members 20, 22 and 24 are provided with latch or bearing surfaces 20a, 22a and 24a defined for instance by circular, through bore openings, adapted to be arranged in operative alignment only when closure 14 is properly seated in closed position and locking ring 16 is disposed in its locked position.

Latch mechanism 10 further includes latch means defined for example by first and second latch members 26 and 28 supported by and for reciprocating movement relative to shell 12 and locking ring 16, respectively; a vessel exhaust control valve 30; and operating means 32 for controlling operation of the latch mechanism.

First latch member 26 includes an enlarged, generally cylindrical head portion 34 sized for free sliding movement within openings 20a and 22a, and a reduced diameter cylindrical stem or rod portion 36 fixed to a valve member or head 38 forming a part of control valve 30. Second latch member 28 is generally cylindrical in form and supported for axial sliding movement in alignment with opening 22a by a guide sleeve 40, which is weld affixed to and extends axially of locking ring 16. The end of second latch member 28 arranged adjacent second shear member 22 is fitted with an abutment 42, which engages with the second shear member for purposes of defining an unlatched or retracted position of the second latch member shown in FIG. 3. Suitable means, such as a coil spring 44 is provided to normally bias second latch member 28 to assume its unlatched position.

Exhaust control valve 30 is defined by a valve body 46 whose interior cavity 48 is disposed in flow communication with the interior of shell 12 via an exhaust conduit 50; a first end closure 52, which serves to define a valve seat 54 bounding an inlet end of an exhaust passage 56 disposed concentrically outwardly of stem portion 36 so as to provide a cylindrically shaped exhaust flow path 56a therebetween; previously mentioned valve member 38; and a second end closure 58, which serves to deform a fluid seal device defined for example by packing rings 60 into sliding, sealing engagement with a cylindrical rod 62 provided to operatively interconnect the valve member and thus first latch member 26 with operating means 32. Exhaust flow path 56a may be placed in direct flow communication with the atmosphere or communicate therewith via a warning device, such as a horn or whistle, as desired.

As will be apparent from viewing FIG. 2, when first latch member 26 is in its illustrated latched condition, valve member 38 is seated against valve seat 54 and blocks flow communication between exhaust conduit 50 and exhaust flow path 56a. Any pressure condition within shell 12 in excess of atmospheric pressure acts on valve member 38 and tends to oppose unseating movement thereof and thus movement of first latch member 26 towards its unlatched condition shown in FIG. 3.

Again referring to FIG. 1, it will be understood that operating means 32 may be manual in nature and include a handle 64, which is pivotally supported by a shell affixed bracket 66 via a pivot pin 68; and a link 70 having its opposite ends pivotally connected to handle 64 and an outer end of rod 62 by pivot pins 72 and 74, respectively. The relative arrangement of pivot pins 68, 72 and 74 provides an over center mechanism serving to releasably lock first latch member 26 in its latched condition, as best shown in FIG. 1, while allowing movement of the first latch member into its unlatched condition upon operator initiated pivotal movement of handle 64 in the direction indicated by arrow 76. Alternatively, operation of operating means 32 may be remotely controlled, by replacing handle 64 with a suitable fluid operated cylinder device, not shown.

When latch mechanism 10 is in its unlatched condition shown in FIG. 3, valve 30 is open for purposes of venting vessel shell 12 via conduit 50, and locking ring 16 is free for rotational movement into its unlocked condition for purposes of freeing closure 14 for movement between its open and closed positions. It is contemplated that second shear member 22 will be provided with a length sufficient to prevent movement of first latch member 26 from its unlatched position and resultant closing of valve 30, due to engagement of the free end of head portion 34 with the second shear member, for all rotatable positions of the locking ring other than its fully locked position, wherein second opening 22a is disposed in operative alignment with first opening 20a.

When closure 14 and locking ring 16 are properly closed and locked, second opening 22a and third opening 24a are disposed in alignment with first opening 20a, whereby permitting manual operation of handle 64 to effect movement of first latch member 26 into its latched position with the free end of head portion 34 arranged to project through second opening 22a and resultant closure of valve 30, as shown in FIG. 2. Incident to movement of first latch member 26 into latched position, the free end of head portion 34 is brought into end abutting engagement with second latch member 28 with the result that the latter is moved against the bias of spring 44 to assume its latched position, wherein it projects through third opening 24a. Thus, with mechanism 10 in its latched condition, unintended rotation of locking ring 16 from its locked position is constrained by the connection afforded by first latch member 26 between the locking ring and shell 12 and by the connection afforded by second latch member 28 between the locking ring and closure 14 whose rotation is normally arrested by its mounting hinge connection to the shell or other stationary structure.

The length of third shear member 24 is sufficient to insure that same will be arranged for abutting engagement by second latch member 28 in order to prevent latching of mechanism 10 in the event that closure 14 is unintentionally rotatably displaced by locking ring 16 from the angular position or orientation it normally assumes relative to shell 12 about the rotational axis of the locking ring or axis of the vessel access opening when properly seated in its fully closed condition. Such unintended rotational displacement of closure 14 and resultant deformation of the closure supporting hinge mechanism, not shown, may occur when locking ring 16 is prematurely rotated into its locked position before closure 14 is fully seated in closed condition, due to circumferentially directed engagement of the locking lugs of the locking ring with those of the closure, as opposed to the camming or sliding engagement of cam surfaces carried by such locking lugs, which normally serves to clamp the closure in fully closed condition.

While not essential to the operation of mechanism 10, it is, however, preferable to associate with the mechanism additional safety features with a view towards insuring against unintended pressurization of a pressure vessel in the event door 14 and locking ring 16 are not in their proper closed and locked conditions and against unlocking rotation of the locking ring while the vessel remains in a pressurized state. As by way of example, suitable sensing means, such as a microswitch 80, may be employed to sense positioning of second latch member 28 within opening 24a, which in the absence of tampering with mechanism 10, can only occur as a result of first latch member 26 having been placed in its latched condition and valve 30 closed to permit pressurization of the vessel. Switch 80 may be employed for various purposes, such as for controlling energization of a light serving to indicate that the vessel is in a pressurized condition or energization of a circuit controlling the introduction of pressurizing fluid into the vessel.

Figure 4:
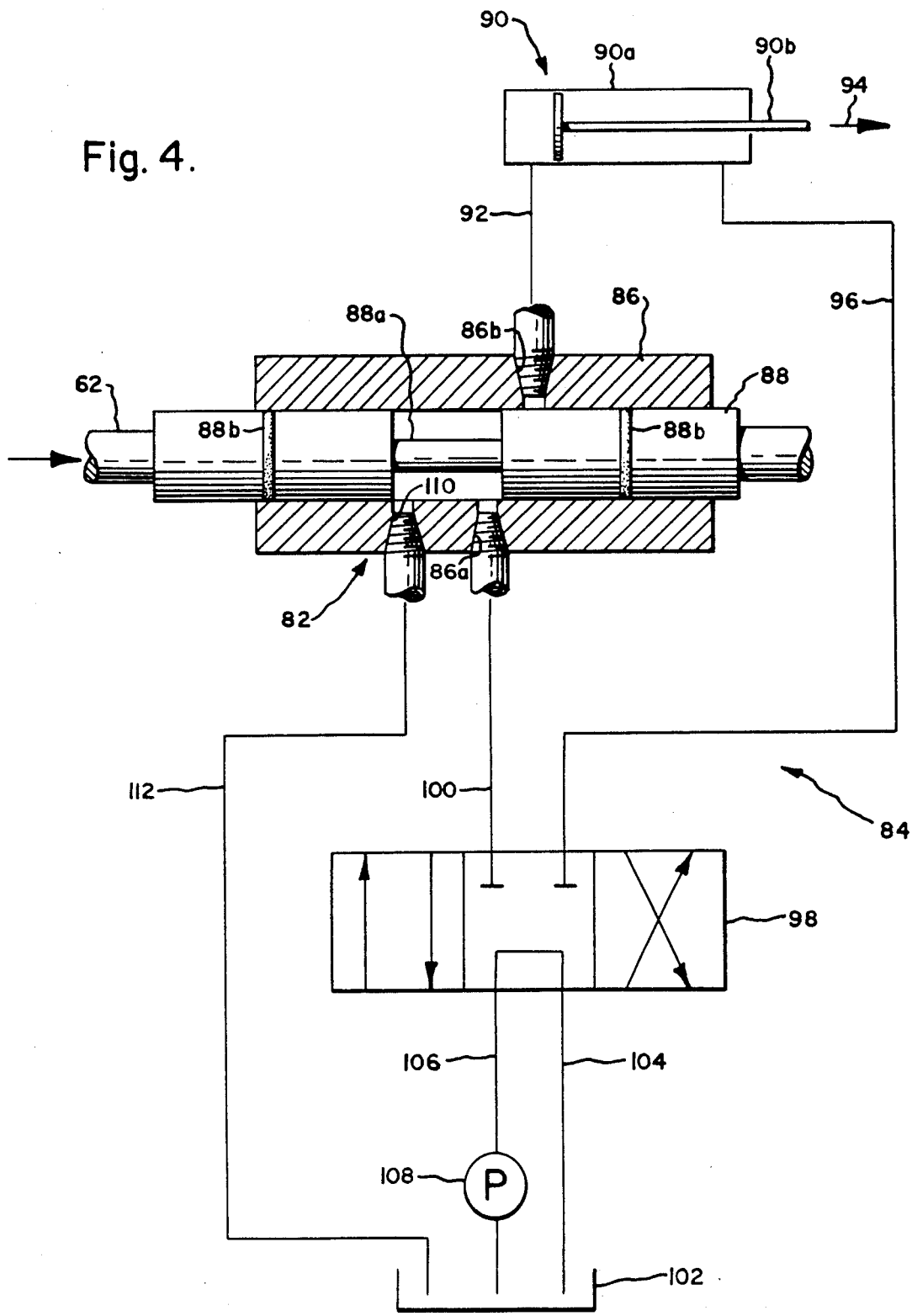
FIG. 4 is a diametric view of an hydraulic circuit for controlling operation of a closure locking ring of a pressure vessel.

A further safety feature, which may be employed in association with mechanism 10 is shown in the drawings as including a flow control valve 82 arranged in association with an hydraulic control circuit designated as 84 in FIG. 4 and employed to effect locking and unlocking rotations of locking ring 16. Valve 82 is shown in FIG. 4 as having a cylindrically shaped valve body 86 fixed to mounting bracket 66 and a valve spool 88 carried by rod 62 intermediate valve 30 and operating means 32. Valve body 86 is provided with inlet and outlet ports 86a and 86b and spool 88 is formed with an annular flow passage or slot 88a and annular recesses for receiving sealing rings 88b.

Control circuit 84 includes an hydraulic cylinder 90 having its cylinder 90a and piston 90b connected to shell 12 and locking ring 16, such that the admission of hydraulic fluid to the closed end of the cylinder via a conduit 92 connected to outlet port 86b of valve 82 serves to extend piston 90b, as indicated by arrow 94, for purposes of rotating locking ring 16 towards its unlocked position. The opposite end of cylinder 90a is connected via a conduit 96 to a four-way valve 98, which is also connected to the inlet port 86a of valve 82 via a conduit 100 and with a sump 102 via a drain conduit 104 and a supply conduit 106 in which is placed a suitable pump 108. Thus, with this arrangement, when mechanism 10 is in its latched condition, valve 82 blocks flow communication between conduits 100 and 92, as shown in FIG. 4, in order to positively prevent the admission of hydraulic fluid into the closed end of cylinder 90 for purposes of unlocking locking ring 16, even if a malfunction should occur in control circuit 84 or an operator should improperly initiate its operation, whereby valve 98 is shifted to the left, as viewed in FIG. 4, and pump 108 is energized. On the other hand, when mechanism 10 is moved to its unlatched condition, passage 88a of spool 88 is aligned with and affords communication between inlet port 86a and outlet port 86b, so as to permit displacement of valve 98 to effect extension and contraction of fluid cylinder 90 for purposes of rotating locking ring 16 between its unlocked and locked positions. If desired, valve 82 may be fitted with a drain port 110, which is disposed for alignment with spool flow passage 88a when mechanism 10 is in a latched condition and connected to sump 102 via conduit 112. This provides a low pressure path for the escape from valve 82 of pressurized fluid, which might otherwise leak around spool 88 between ports 86a and 86b in the event pump 108 should be unintentionally energized.

What is claimed is:

1. A latch mechanism for use with a pressure vessel of the type having a shell, a closure for removably closing an opening in said shell, a locking ring rotatable about an axis relative to said shell and closure for releasably locking said closure in a shell opening closed condition and a vessel exhaust conduit, said closure being characterized as having a predetermined angular orientation relative to said shell about said axis of rotation of said locking ring when properly seated in vessel opening closed condition, said mechanism comprising in combination:
   first, second and third shear members fixed respectively to said shell, said locking ring and said closure, said first, second and third shear members having respectively first, second and third latch openings extending therethrough;
   a first latch member supported by said shell for movement between a latched position, wherein said first latch member is received within both of said first and second latch openings, and an unlatched position, wherein said first latch member is removed from within said second latch opening, said second shear member blocking movement of said first latch member into said latched position thereof until placement of said second latch opening in operative alignment with said first latch opening upon movement of said locking ring into a closure locked position thereof;
   a second latch member supported by said locking ring for movement between an unlatched position and a latched position;
   means tending to bias said second latch member into said unlatched position thereof, said first latch member tending to move said second latch member into its latched position against said bias incident to movement of said first latch member into its latched position, said second latch member being received within said third latch opening upon movement of said second latch member into its latched position only when said closure is properly seated in vessel opening closed condition and said locking ring is in its closure locked position;
   an exhaust valve connected to said exhaust conduit and having vessel exhaust closed and open conditions corresponding to said latched and unlatched positions of said first latch member; and
   means for moving said first latch member between said unlatched and latched positions thereof.

2. A latch mechanism according to claim 1, wherein said mechanism additionally includes means for sensing receipt of said second latch member within said third latch opening.

3. A latch mechanism according to claim 1, wherein said first latch member is disposed for reciprocating movement in alignment with said first latch opening and said second latch member is disposed for reciprocating movement in alignment with said second latch opening.

4. A latch mechanism according to claim 3, wherein said exhaust valve opposes movement of said first latch means into said unlatched position thereof when exposed to a pressure existing within said shell in excess of atmospheric pressure.

5. A latch mechanism according to claim 1, wherein said pressure vessel includes a fluid control circuit for selectively supplying fluid to opposite ends of a piston cylinder device extensible and retractable for purposes of effecting rotation of said locking ring from said closure locked position thereof into a closure unlocked position thereof, and said mechanism additionally includes a control valve arranged within said fluid control circuit and having first and second conditions corresponding to said latched and unlatched positions of said first latch member, said control valve when in said first condition thereof blocking flow of fluid to said piston cylinder device to prevent operation thereof for purposes of rotating said locking ring from said closure locked position thereof and when in said second condition thereof permitting flow of fluid to said piston cylinder device for purposes of rotating said locking ring into said unlocked position thereof.

6. A latch mechanism according to claim 5, wherein said exhaust valve includes a valve member movable between exhaust closed and open conditions, said control valve includes a spool movable between positions defining said first and second conditions of said control valve, said valve member is connected to both said first latch member and said spool, said means for moving said first latch member is connected to an end of said spool remotely of said exhaust valve.

7. A latch mechanism for use with a pressure vessel of the type having a shell, a closure for removably closing an opening in said shell, a locking ring rotatable about an axis relative to said shell and closure for releasably locking said closure in a shell opening closed condition and a vessel exhaust conduit, said closure being characterized as having a predetermined angular orientation relative to said shell about said axis of rotation of said locking ring when said closure is properly seated in vessel opening closed condition, said mechanism comprising in combination:

first, second and third shear members fixed respectively to said shell, said locking ring and said closure;

latch means movable between an unlatched condition and a latched condition, wherein said latch means is positioned to simultaneously engage with said first, second and third shear members for preventing rotation of said locking ring away from a closure locked position thereof;

exhaust valve means communicating with said exhaust conduit and connected to said latch means, said exhaust valve means having exhaust conduit open and closed conditions corresponding to said unlatched and latched conditions of said latch means, said exhaust valve means when exposed to pressure existing within said vessel in excess of atmospheric pressure opposing movement of said latch means into said unlatched condition thereof; and means for moving said latch means between said unlatched and latched conditions thereof.

8. A latch mechanism according to claim 7, wherein said exhaust valve has a chamber communicating with said exhaust conduit, a valve seat bounding an inlet of an exhaust passage communicating with said chamber and a valve member arranged within said chamber for removable engagement with said valve seat for closing said inlet, and said valve member is supported by said latch means for movement into and out of engagement with said valve seat upon placement of said latch means in said latched and unlatched conditions.

9. A latch mechanism according to claim 8, wherein said first, second and third shear members have respectively first, second and third latch openings extending therethrough, said first, second and third latch openings being disposed in operative alignment only when said closure is properly seated in vessel opening closed position, said latch means includes a first latch member supported by said shell and extending inwardly of said exhaust valve means through said exhaust passage, said first latch member carrying said valve member and being removably received within said first and second latch openings when said locking ring is in said closure locked condition and a second latch member supported by said locking ring for removable receipt within said third latch opening when said closure is properly seated in said vessel opening closed position and said locking ring is in said closure locked condition, said second latch member being movable to a position within said third latch opening in response to movement of said first latch member into said second latch opening.

10. A latch mechanism according to claim 9, wherein spring means is provided to bias said second latch member for movement from within said third latch opening.

11. A latch mechanism according to claim 10, wherein said operating means is connected to said first latch member by a means extending into said exhaust valve through an end thereof opposite to said exhaust passage and connected to said valve member.

12. A latch mechanism according to claim 9, wherein said latch mechanism additionally includes means for sensing placement of said second latch member within said third latch opening.

13. A latch mechanism according to claim 7, wherein said pressure vessel includes a fluid control circuit for selectively supplying fluid to opposite ends of a piston cylinder device extensible and retractable for purposes of effecting rotation of said locking ring from said closure locked condition into a closure unlocked condition, and said mechanism additionally includes a control valve arranged within said fluid control circuit and having first and second conditions corresponding to said locked and unlocked conditions of said latch means, said control valve when in said first condition thereof blocking flow of fluid to said piston cylinder device to prevent operation thereof for purposes of rotating said locking ring from said closure locked condition and in said second condition permitting flow of fluid to said piston cylinder device for purposes of rotating said locking ring between said closure locked and unlocked conditions thereof.

14. A latch mechanism according to claim 13, wherein said control valve has a stationary valve body and a valve spool slidably supported therewithin; said exhaust valve has a stationary valve body defining a chamber communicating with said exhaust conduit, a valve seat bounding an inlet of an exhaust passage communicating with said chamber and a valve member arranged within said chamber for removable engagement with said valve seat for closing said inlet; said first and second shear members have first and second latch openings; said latch means includes a first latch member having one end thereof arranged for receipt within said first latch opening when said latch means is in said unlatched condition and within both of said first and second latch openings when said latch means is in said latched condition, said second shear member engaging with said first latch member for preventing movement of said latch means into said latched condition until said second latch opening is positioned to receive said one end of said first latch member coincident with placement of said locking ring in said closure locked position, said first latch member having an opposite end projecting inwardly through said exhaust passage for connection with said valve member, said valve member is connected to one end of said spool by a rod extending into said control valve through an end thereof opposite to said exhaust passage; and said means for moving said latch means is connected to an opposite end of said spool.

15. A mechanism according to claim 14, wherein said latch means includes a second latch member supported by said locking ring for movement between unlatched and latched positions, means tending to releasably bias said second latch member into said unlatched position, said first latch member engaging with said second latch member upon receipt of the former within said second latch opening and tending to move said second latch member into said latched position thereof against said bias, said third shear member has a third latch opening arranged to receive said second latch member upon movement thereof into said latched position only when said locking ring is in said closure locked condition and said closure is properly seated in vessel opening closed condition.

16. A mechanism according to claim 15, wherein means are provided to sense positioning of said second latch member within said third latch opening.

* * * * *